(12) United States Patent
Redford

(10) Patent No.: US 8,640,116 B2
(45) Date of Patent: Jan. 28, 2014

(54) LOADER MODULE, AND METHOD FOR LOADING PROGRAM CODE INTO A MEMORY

(75) Inventor: John Redford, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1533 days.

(21) Appl. No.: 10/896,053

(22) Filed: Jul. 22, 2004

(65) Prior Publication Data

US 2005/0193384 A1   Sep. 1, 2005

Related U.S. Application Data

(60) Provisional application No. 60/547,534, filed on Feb. 26, 2004.

(51) Int. Cl.
  *G06F 9/44*     (2006.01)
  *G06F 11/00*    (2006.01)
  *G11C 29/00*    (2006.01)

(52) U.S. Cl.
  USPC .............................. 717/166; 714/42; 714/718

(58) Field of Classification Search
  None
  See application file for complete search history.

(56) References Cited

U.S. PATENT DOCUMENTS

| | | | | |
|---|---|---|---|---|
| 4,939,694 | A * | 7/1990 | Eaton et al. | 714/710 |
| 6,098,194 | A * | 8/2000 | Rinne et al. | 714/718 |
| 6,108,797 | A * | 8/2000 | Lin et al. | 714/35 |
| 6,141,768 | A * | 10/2000 | Lin et al. | 714/38.13 |
| 6,178,549 | B1 * | 1/2001 | Lin et al. | 717/124 |
| 6,370,655 | B1 * | 4/2002 | Lin | 714/42 |
| 6,560,773 | B1 * | 5/2003 | Alexander et al. | 717/128 |
| 6,631,521 | B1 * | 10/2003 | Curtis | 717/166 |
| 6,658,652 | B1 * | 12/2003 | Alexander et al. | 717/128 |
| 6,691,246 | B1 * | 2/2004 | Lin | 714/34 |
| 6,829,722 | B2 * | 12/2004 | Lin | 714/6.13 |
| 6,986,132 | B1 * | 1/2006 | Schwabe | 717/166 |
| 7,032,217 | B2 * | 4/2006 | Wu | 717/158 |
| 7,092,375 | B2 * | 8/2006 | Pitsoulakis | 370/338 |
| 7,103,736 | B2 * | 9/2006 | Sachs | 711/159 |
| 7,124,336 | B2 * | 10/2006 | Adler et al. | 714/718 |
| 7,257,692 | B2 * | 8/2007 | Schumacher | 711/170 |
| 7,293,142 | B1 * | 11/2007 | Xu et al. | 711/124 |

(Continued)

OTHER PUBLICATIONS

Xin Li; Toward a Better Understanding of the Properties and Impact of Memory Hardware Errors; 2012; retrieved online on Sep. 8, 2013; pp. 1-131; Retrieved from the Internet: <URL: http://www.ece.rochester.edu/projects/acal/docs/Thesis/li.PhD12.pdf>.*

(Continued)

*Primary Examiner* — Thuy Dao
*Assistant Examiner* — Hanh T Bui
(74) *Attorney, Agent, or Firm* — Sterne, Kessler, Goldstein & Fox PLLC

(57) ABSTRACT

A loader module for loading program code into a memory is described, whereby the memory may be partially defective, with non-defective parts of the memory being indicated by diagnostic information. The loader module is adapted for loading program code, in accordance with the diagnostic information, into non-defective parts of the memory, and for relinking the program code in accordance with the memory locations it has been loaded to. Furthermore, a method for loading program code into a memory is described. The method comprises the following steps which may be carried out in arbitrary order: loading program code, in accordance with diagnostic information, into non-defective parts of the memory, and relinking the program code in accordance with the memory locations it has been loaded to.

23 Claims, 4 Drawing Sheets

(56) References Cited

U.S. PATENT DOCUMENTS

| | | | |
|---|---|---|---|
| 7,293,263 B2* | 11/2007 | Dahlstedt et al. | 717/154 |
| 7,313,661 B1* | 12/2007 | Dmitriev | 711/159 |
| 7,404,117 B2* | 7/2008 | Ong et al. | 714/718 |
| 7,743,303 B2* | 6/2010 | Nobunaga et al. | 714/718 |
| 7,779,311 B2* | 8/2010 | Ong | 714/718 |
| 7,895,588 B2* | 2/2011 | Rossmann | 717/166 |
| 8,429,629 B2* | 4/2013 | Drepper | 717/166 |
| 2001/0037436 A1* | 11/2001 | Blumenstock | 717/11 |
| 2002/0199130 A1* | 12/2002 | Kuo | 714/8 |
| 2003/0014688 A1* | 1/2003 | Wu | 714/7 |
| 2003/0028342 A1* | 2/2003 | Adler et al. | 702/120 |
| 2003/0061597 A1* | 3/2003 | Curtis et al. | 717/128 |
| 2003/0076355 A1* | 4/2003 | Kodosky | 717/109 |
| 2003/0163661 A1* | 8/2003 | Marion et al. | 711/170 |
| 2004/0078700 A1* | 4/2004 | Jeong | 714/42 |
| 2004/0093597 A1* | 5/2004 | Rao et al. | 717/171 |
| 2004/0162903 A1* | 8/2004 | Oh | 709/228 |
| 2005/0091646 A1* | 4/2005 | Chilimbi et al. | 717/130 |
| 2005/0114843 A1* | 5/2005 | Gilgen et al. | 717/127 |
| 2005/0120265 A1* | 6/2005 | Pline et al. | 714/7 |
| 2005/0204342 A1* | 9/2005 | Broussard | 717/124 |
| 2007/0094555 A1* | 4/2007 | Ong et al. | 714/718 |
| 2008/0189582 A1* | 8/2008 | Ho et al. | 714/718 |
| 2010/0235821 A1* | 9/2010 | Baldwin et al. | 717/166 |
| 2011/0078672 A1* | 3/2011 | Stark et al. | 717/166 |
| 2012/0324433 A1* | 12/2012 | Kabanov | 717/166 |

OTHER PUBLICATIONS

Hovav Shacham et al.; On the Effectiveness of Address-Space Randomization; ACM; Oct. 25, 2004; retrieved online on Sep. 8, 2013; pp. 298-307; Retrieved from the internet <URL: http://delivery.acm.org/10.1145/1040000/1030124/p298-shacham.pdf?>.*

P. Bernardi et al.; An efficient algorithm for the extraction of compressed diagnostic information from embedded memory cores; IEEE; 2003; retrieved online on Sep. 8, 2013; pp. 417-421; Retrieved from the internet: <URL: http://ieeexplore.ieee.org/stamp/stamp.jsp?tp=&arnumber=1247736>.*

* cited by examiner

LOADER MODULE, AND METHOD FOR LOADING PROGRAM CODE INTO A MEMORY

CROSS-REFERENCE TO RELATED APPLICATIONS

This application makes reference to, claims priority to and claims benefit of: U.S. Provisional Patent Application No. 60/547,534, filed Feb. 26, 2004, entitled "Soft Relocation for Bad Memory", which is incorporated by reference herein in its entirety.

FIELD OF THE INVENTION

This invention relates to a loader module for loading program code into a memory, and to a memory. Furthermore, the invention relates to a method for loading program code into a memory.

BACKGROUND OF THE INVENTION

In general, memory units may comprise arrays of hundreds and thousands of memory cells, whereby none of the memory cells may be defective. This imposes severe restrictions on the manufacturing process, and as a consequence, the yield of the manufacturing process might become rather small.

In the prior art, various solutions have been developed for increasing the yield. For example, the memory may be provided with redundant memory cells. If one or more of the memory cells are defective, corresponding redundant memory cells can be activated instead. The redundant memory cells might e.g. be activated by means of fuses, by means of high voltage programming pulses, etc.

SUMMARY OF THE INVENTION

The present invention provides a loader module for loading program code into a memory that may be partially defective, with non-defective parts of said memory being indicated by diagnostic information.

Said loader module is adapted for loading program code, in accordance with the diagnostic information, into non-defective parts of the memory, and for relinking the program code in accordance with the memory locations it has been loaded to.

In one variant, the loader module is further adapted for performing a memory test in order to obtain the diagnostic information.

In another variant, the diagnostic information is provided by an external diagnostic facility.

In yet another variant, the loader module is implemented as an executable program contained in a non-defective part of said memory.

In another variant, the loader module is implemented as an external loading facility, preferably by means of an external processing unit.

In yet another aspect, the program code is program code of a conventional imperative language.

In yet another aspect, the loader module is adapted for allocating a code area and at least one of a read only data area, a read write data area, and a stack area before loading the program code into the memory.

In another aspect, the loader module is adapted for receiving the program code via a communication network.

In another variant, the loader module is adapted for loading the program code in sections.

In yet another variant, relinking the program code comprises modifying at least one of the program code's instructions, absolute addresses and relative addresses, in order to adapt the program code to the respective memory locations it has been loaded to.

In yet another variant, said modifications are carried out after the program code has been loaded into non-defective parts of the memory, whereby said modifications have no impact on the memory space occupied by the program code's instructions, absolute addresses and relative addresses.

In yet a further variant, relinking the program code comprises modifying the most significant bits of the program code's addresses, in order to adapt the program code to the respective non-defective memory banks it has been loaded to.

In yet a further variant, the program code is relinked, in accordance with the diagnostic information, in advance before it is loaded into non-defective parts of the memory.

In yet a further aspect, the loader module is adapted for loading program code into a memory of an xDSL card.

The present invention further provides a memory that may be partially defective, with non-defective parts of the memory being indicated by diagnostic information.

The memory comprises a loader program that is contained in a non-defective part of the memory. The loader program is adapted for loading program code, in accordance with the diagnostic information, into non-defective parts of the memory, and for relinking the program code in accordance with the memory locations it has been loaded to.

In one variant, the memory comprises a set of memory banks, with non-defective memory banks being indicated by the diagnostic information.

Furthermore, the present invention provides a method for loading program code into a memory, whereby said memory may be partially defective, and with non-defective parts of the memory being indicated by diagnostic information.

The method comprises the following steps which may be carried out in arbitrary order: loading program code, in accordance with the diagnostic information, into non-defective parts of the memory, and relinking the program code in accordance with the memory locations it has been loaded to.

In yet a further variant, the invention provides a software program or product, preferably stored on a data carrier, for executing the method described herein when the computer program product is executed on a computer, processing unit, digital signal processor, or the like.

It is appreciated that these and other aspects of the invention will become apparent to those skilled in the art in the detailed description and drawings contained herein.

DETAILED DESCRIPTION

Figure 1:
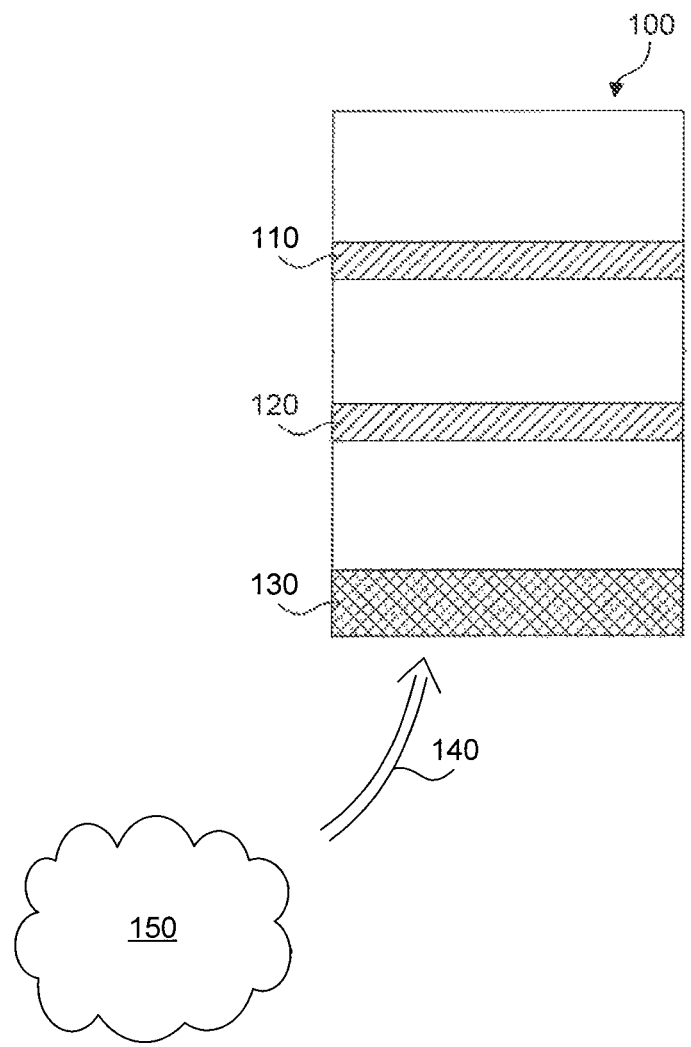
FIG. 1 shows a first embodiment of the invention, whereby the loader module is implemented as an executable program stored in a memory.

The present invention provides a loader module for loading program code into a memory that may be partially defective, with non-defective parts of said memory being indicated by diagnostic information.

The loader module is adapted for loading program code, in accordance with the diagnostic information, into non-defective parts of the memory, and for relinking the program code in accordance with the memory locations it has been loaded to.

A loader module according to the present invention allows to load program code into a defective memory in a way that the defective parts of the memory are not used. The defective parts are indicated by diagnostic information. The program code, which might e.g. be compiled program code, is loaded into non-defective parts of the memory. In order to adapt the program code to the memory locations it has been stored to, a step of relinking the program code is performed. As a result, defective parts of the memory will not impair execution of the relinked program code.

A loader module according to an embodiment of the present invention allows to make use of memory chips even in case they are partially defective. In prior art solutions, only the non-defective memory chips have been employed for assembling electronic devices. By installing a loader module according to an embodiment of the present invention, the entire output of the chip manufacturing process can be used, and not just a small percentage thereof.

Memory chips that have been classified as being partially defective can be used for assembling electronic devices as well, and as a consequence, the cost per electronic device is considerably reduced. Due to the increasing complexity of memory chips, inventions of this kind will become more and more important.

Preferably, the loader module is further adapted for performing a memory test in order to obtain the diagnostic information. If the testing functionality is integrated into the loader module itself, no external memory tester will be required. Diagnostic information indicating the status of the memory is acquired by the loader module itself. Hence, a simple and cheap solution is provided.

Alternatively, the diagnostic information might be provided by an external diagnostic facility. The loader module according to an embodiment of the present invention may cooperate with any kind of external diagnostic facility such as e.g. an external processing unit, a dedicated memory tester, etc. For this reason, the loader module can be used in a variety of different environments.

A memory test might comprise writing data to and reading data from at least some of the memory's addresses. By comparing data that has been written to a certain memory cell with data that is read from said memory cell subsequently, it is possible to identify defective memory cells. Besides that, more complex memory faults can be identified by applying test patterns that comprise sequences of write and read accesses.

The loader module might be implemented as an executable program contained in a non-defective part of said memory. In this embodiment, the loading and relinking functionality is realized by means of software that is stored within the memory itself. Accordingly, the loader module can be implemented without any additional hardware. This embodiment represents the cheapest way of implementing the present invention. Generally, the size of the loader module might be so small that the available memory space is not reduced significantly. The loader module is adapted for loading the program code into the remaining part of the memory.

Alternatively, the loader module might be implemented as an external loading facility, preferably by means of an external processing unit. For example, the memory might be part of an electronic device that comprises a processing unit anyway. In this case, it might be favourable to make use of this processing unit in order to implement the loading and relinking functionality. Alternatively, extra hardware might be provided, with said hardware being adapted for performing the loading and relinking tasks. Preferably, said extra hardware might additionally perform the memory testing.

In one variant, the program code is program code of a conventional imperative language, like e.g. C, $C^{++}$, Pascal, Fortran, etc.

Further preferably, the loader module is adapted for allocating a code area and at least one of a read only data area, a read write data area, and a stack area before loading the program code into the memory. Memory allocation is performed in accordance with the required sizes of the respective areas, and in accordance with the locations of the non-defective parts of the memory as indicated by the diagnostic information. The required sizes of the code area, the read only data area, the read write data area and the stack area might e.g. be transmitted as a part of the program code that is received by the loader module.

When allocating these areas of memory, it has to be made sure that they are placed in the memory in a way that defective parts of the memory do not obstruct execution of the program code. For example, data contained within the read write data area or within the stack area is frequently modified. For this reason, the stack area and the read write data area should not comprise any gaps. Hence, as far as the read write data area and the stack area are concerned, it is favourable to allocate contiguous areas of memory. In contrast, with respect to the code area and the read only data area, the allocated memory space might as well be non-contiguous.

The loader module might receive the program code directly from a compiler. Alternatively, the loader module might be adapted for receiving the program code via a communication network. For example, a device that is connected with the internet might receive compiled program code via the internet. An xDSL card might e.g. receive program code via an xDSL line.

As soon as a new version of a certain program is available, the new version can be transmitted to the device via the respective communication network. Furthermore, bug fixes and updates can be distributed via the communication network as well.

Preferably, the loader module is adapted for loading the program code in sections. As soon as a first code section has been received by the loader module, said first code section is loaded into the memory. Then, a second code section is received and loaded into the memory, etc. Thus, the loading process can be related to the rate at which the program code is received.

In one variant, relinking the program code comprises modifying at least one of the program code's instructions, absolute addresses and relative addresses, in order to adapt the program code to the respective memory locations it has been loaded to. For example, if a certain memory section is subjected to code relocation, the corresponding absolute and relative addresses have to be corrected accordingly. For example, it might be necessary to modify the target addresses of jump and branch instructions.

According to a preferred embodiment, said modifications are carried out after the program code has been loaded into non-defective parts of the memory, whereby said modifications have no impact on the memory space occupied by the program code's instructions, absolute addresses and relative addresses. In the step of relinking, certain bytes of the program code might be accessed and modified after the program code has been loaded into the memory.

For example, address bytes might have to be changed, instruction codes might have to be modified, etc. In general, modifications of this kind have no impact on the respective size of the instructions.

In another variant, relinking the program code comprises modifying the most significant bits of the program code's addresses, in order to adapt the program code to the respective non-defective memory banks it has been loaded to. The various memory banks are commonly distinguished by means of the addresses' most significant bits (MSBs). The most significant bits are related to respective memory banks in one-to-one correlation. In case a memory bank is found to be defective, the most significant bits of addresses that refer to the defective memory bank are replaced by the most significant bits of a non-defective memory bank that is used instead.

In an alternative embodiment, the program code is relinked, in accordance with the diagnostic information, in advance before it is loaded into non-defective parts of the memory. The program code is relinked in accordance with the diagnostic information, whereby the diagnostic information indicates the non-defective parts of the memory the program code will be stored to. The relinked program code is transmitted to the loader module, which loads the relinked program code into the memory. The step of relinking might e.g. be performed on the part of a remote computer. Via a communication network, diagnostic information might be transmitted to the remote computer, and there, the program code might be relinked in accordance with the diagnostic information. The relinked program code might be transmitted to the loader module via the communication network, and the loader module might load the relinked program code into the memory.

In another embodiment, the loader module is adapted for loading program code into a memory of an xDSL card. Preferably, the program code is received via an xDSL line.

Furthermore, the invention relates to a memory that may be partially defective, with non-defective parts of the memory being indicated by diagnostic information. The memory comprises a loader program that is contained in a non-defective part of the memory. The loader program is adapted for loading program code, in accordance with the diagnostic information, into non-defective parts of the memory, and for relinking the program code in accordance with the memory locations it has been loaded to.

In one variant, the memory comprises a set of memory banks, with non-defective memory banks being indicated by the diagnostic information. If a certain memory bank comprises a defective memory cell, the entire memory bank will be considered as being defective. In this embodiment, the overhead required for keeping track of defective memory banks is rather small.

Furthermore, the invention relates to a method for loading program code into a memory, whereby said memory may be partially defective, with non-defective parts of the memory being indicated by diagnostic information. The method comprises the following steps which may be carried out in arbitrary order: loading program code, in accordance with the diagnostic information, into non-defective parts of the memory, and relinking the program code in accordance with the memory locations it has been loaded to.

In FIG. 1, a memory 100 for storing program code is shown. The memory 100 may comprise a plurality of memory banks, whereby some of the memory banks may be defective. In a first step, the status of the memory 100 is determined by performing a memory test. Predefined sequences of data are written to and read from different memory addresses. By comparing data that has been read from a memory address with data that has been written to the same memory address before, memory faults can be detected.

As a result of the memory test, diagnostic information indicating the locations of defective memory banks is obtained. For the memory 100, it might e.g. be found that the memory banks 110 and 120 are broken.

In the embodiment shown in FIG. 1, the memory test is performed by a loader module 130, that is contained in a non-defective part of the memory 100. The loader module 130 comprises routines for performing the memory test before loading the program code into the memory 100. Alternatively, in another embodiment, the memory test might be performed by an external memory tester facility that is capable of writing data to and reading data from the memory 100.

After the memory test has been performed, the external memory tester facility has to provide diagnostic information indicating the status of the memory 100 to the loader module 130.

The loader module 130 is adapted for receiving program code 140 that has to be loaded into the memory 100. The program code 140 might e.g. be compiled program code of a conventional imperative language like C, C++, Fortran, Pascal, etc. Typically, a format like e.g. ELF (Executable and Linking Format) is employed. The program code 140 might e.g. be provided to the loader module 130 by a compiler. Alternatively, as shown in FIG. 1 the program code 140 might be received via a communication network 150 like e.g. the internet, a DSL line, etc. Transmitting the compiled program code 140 via a communication network 150 allows to provide updates, bug fixes and modifications for software that is stored in the memory.

Before the program code 140 is loaded into to memory 100, the loader module 130 allocates memory space required for storing the program code 140 into the memory. The program code 140 might comprise information that indicates the size of the required memory space, in particular the size of the code area, the read only data area, the read write data area and the stack area. In accordance with this information, and in accordance with the diagnostic information that indicates defective memory banks, the required areas of memory are allocated.

Figure 2:
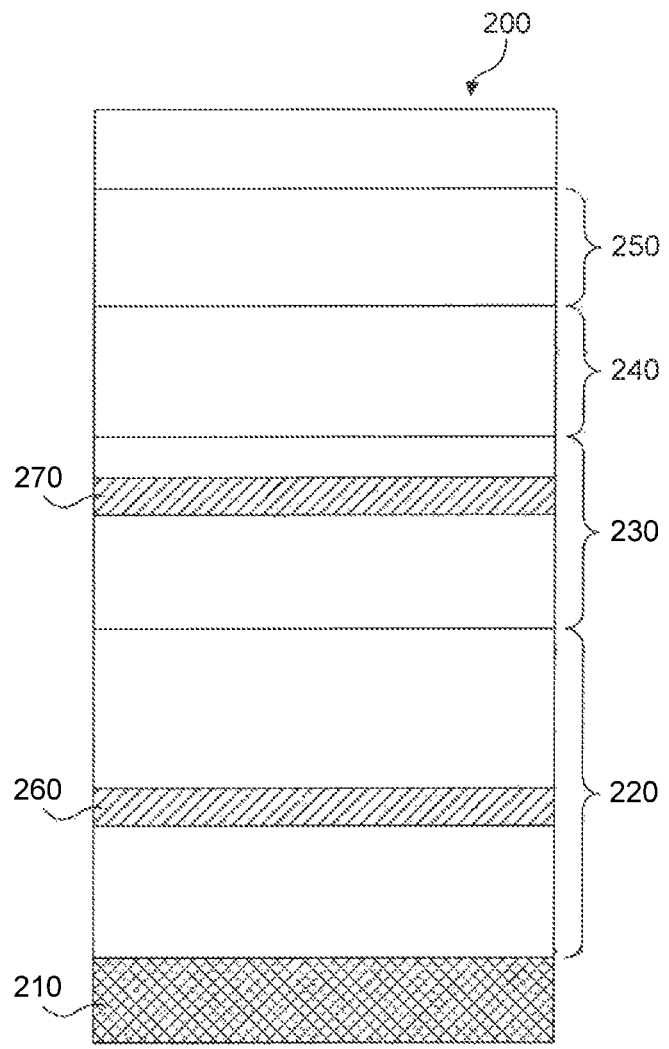
FIG. 2 depicts a memory, whereby a code area, a read only data area, a read write data area and a stack area have been allocated.

In FIG. 2, a memory 200 with a loader module 210 is shown after the allocation has been performed. Then, the memory 200 might e.g. comprise a code area 220, a read only data area 230, a read write data area 240 and a stack area 250. The memory allocation has to be performed in a way that the execution of the program code is not obstructed by the defective memory banks 260, 270. For example, the code area 220 may comprise gaps that correspond to defective memory banks.

However, if the gaps were placed within a certain subroutine, relative addressing in this subroutine would be impaired considerably. For this reason, it should be made sure that a respective gap is placed between two adjacent subroutines. Also the read only data area 230 may comprise gaps; the predefined data objects contained in the read only data area 230 may be arranged around the gaps in a suitable manner. In contrast, data stored in the read write data area 240 and in the stack area 250 is frequently subjected to modifications. Hence, with respect to the read write data area 240 and the stack area 250, it is favourable to allocate contiguous, non-defective parts of the memory.

The program code is loaded into the allocated non-defective parts of the memory 200. Preferably, the loading takes place in sections. For example, a first section of program code might be received via the communication network. Subsequently, this first section is written, by the loader module 210, to an allocated non-defective part of the memory 200. Then, a second section of program code is received, stored to the memory, etc.

Next, the loader module 210 relinks the program image in accordance with the diagnostic information. During the step of relinking, the respective instructions and addresses of the program code are adapted to the memory locations the program code has been stored to. Gaps that correspond to broken memory banks are taken into account. Besides that, different parts of the program code that have been stored to different memory locations are related to one another. In the step of relinking, the loader module 210 might modify at least one of instructions, relative addresses and absolute addresses of the program code.

In general, relinking can be performed by modifying single bytes of the program image. For this reason, the step of relinking does not involve any shifting or transferring of the program code, or of parts thereof.

Different memory banks are commonly distinguished by their addresses' most significant bits (MSBs). Hence, the program code can be adapted to the respective memory banks it has been stored to by adjusting the addresses' most significant bits accordingly. After the steps of loading and relinking have been performed, the program contained in the memory 200 may be executed.

Figure 3:
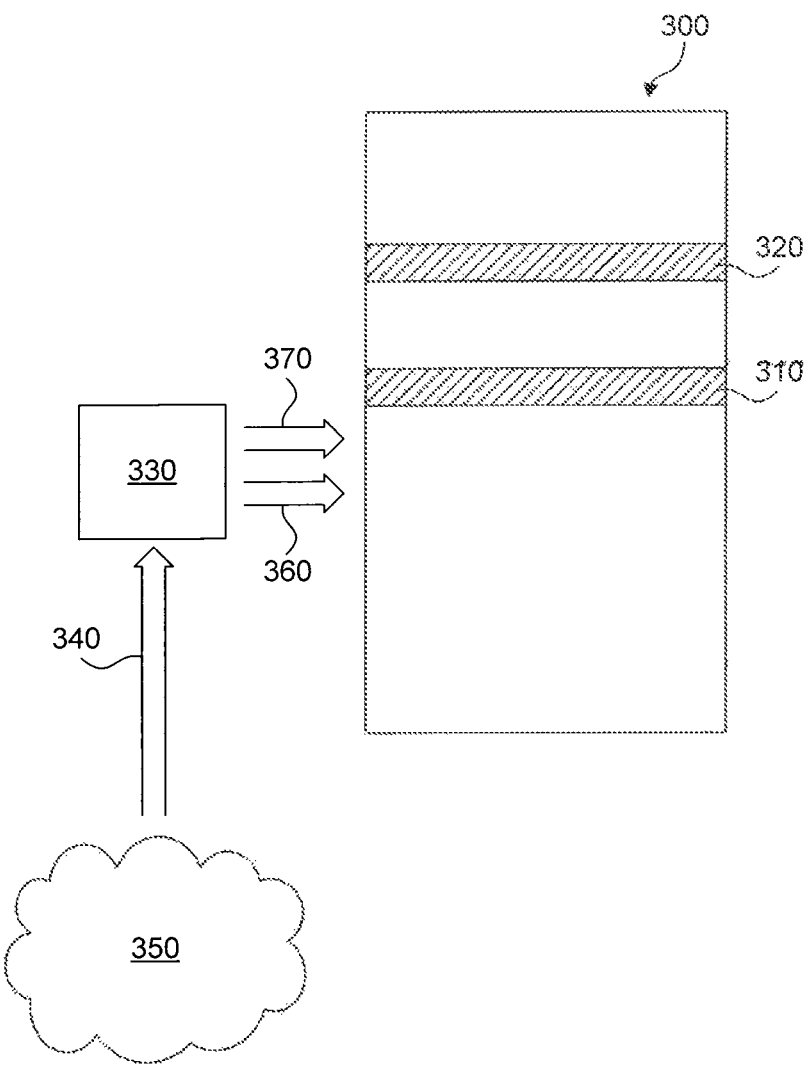
FIG. 3 shows another embodiment of the invention, whereby the loader module is implemented as an external loading facility.

In FIG. 3, another embodiment of the present invention is shown. In the embodiments described so far, the loader module has been implemented as an executable program stored in the memory itself. In the embodiment of FIG. 3, the loader program has been replaced by an external loading facility 330, which might e.g. be realized by means of a processing unit. The respective status of the memory 300 is indicated by diagnostic information that has to be on-hand on the part of the external loading facility 330. In particular, the respective locations of defective parts 310, 320 of the memory have to be known. In order to obtain this information, the external loading facility 330 might e.g. perform a memory test.

Alternatively, the memory test might e.g. be performed by a dedicated diagnostic facility, and the obtained diagnostic information might be forwarded to the external loading facility 330. The external loading facility 330 receives program code 340 via a communication network 350. In accordance with the diagnostic information, the received program code is stored (370) into non-defective parts of the memory 300. After the program code has been loaded, the external loading facility 330 relinks (360) the program image, in order to adapt the program code's instructions and addresses to the respective memory locations the program code has been stored to.

Figure 4:
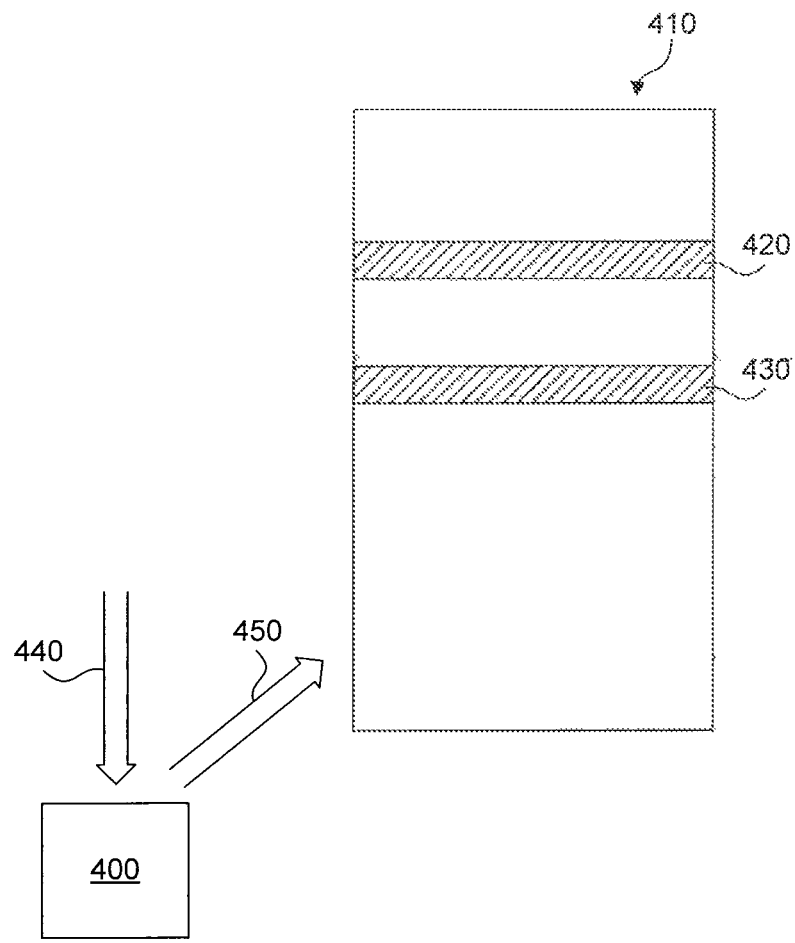
FIG. 4 shows another embodiment of the invention, whereby the step of relinking is performed before the program code is loaded into the memory.

In the embodiments shown in FIG. 1 to FIG. 3, the step of relinking is performed after the program code has been loaded into the memory. In FIG. 4, an alternative embodiment of the present invention is depicted, whereby the program code is relinked in advance, before it is loaded to the respective memory. In this embodiment, the step of relinking is performed on the part of an external processing unit 400.

Again, the memory 410 may comprise defective memory banks 420, 430, whereby diagnostic information 440 indicating the locations of the broken memory banks 420, 430 is provided to the processing unit 400. In accordance with the diagnostic information 440, the processing unit 400 generates a relinked version of the compiled program code, whereby the respective positions of the defective memory banks 420, 430 are taken into account. Next, the relinked program code is loaded (450) into non-defective parts of the memory 410.

The relinking might be performed on a processing unit 400 of a remote station. In this case, the diagnostic information 440 has to be transmitted to the processing unit 400 via a communication network. The communication network might as well be employed for loading the relinked program code generated by the processing unit 400 into the memory 410.

On the part of the processing unit 400, the relinking of the program code can be performed as soon as the diagnostic information 440 is available. Alternatively, several relinked versions of the program code may be created in advance, with said versions corresponding to different standard situations. For example, a first version might correspond to memory bank #1 being defective, a second version might correspond to memory bank #2 being defective, etc.

In this case, the diagnostic information 440 is used for selecting one out of a plurality of relinked versions that corresponds to the respective status of the memory. In this way, devices that comprise a memory that is partially defective can be supplied with a suitable version of relinked program code.

What is claimed is:

1. A computer program product comprising a non-transitory computer-readable medium having a loader module embodied in said medium for causing a processor to execute instructions directing the processor to:
   load program code into non-defective parts of a partially defective memory, the non-defective parts being identified by diagnostic information; and
   relink the program code in accordance with locations of the non-defective parts of the memory to which the program code has been loaded, wherein:
   relinking the program code comprises modifying at least one of an absolute address and a relative address of at least one instruction of the program code in order to adapt an executable portion of the program code to the respective non-defective memory locations into which the program code has been loaded;
   said address modifying is carried out after the program code has been loaded in the non-defective parts of the memory, and
   wherein said relinking does not change a size of the memory space occupied in the memory by the program code's instructions, absolute addresses, and relative addresses.

2. The computer program product of claim 1, wherein the loader module is further configured to test the memory in order to obtain the diagnostic information.

3. The computer program product of claim 1, wherein said loader module is configured to receive the diagnostic information from an external diagnostic facility.

4. The computer program product of claim 1, wherein the loader module is configured to load itself as an executable program contained in a non-defective part of said memory and to run on a processor associated with said memory.

5. The computer program product of claim 1, wherein the loader module is configured to run on an external processing unit dedicated to said loading and relinking tasks.

6. The computer program product of claim 1, wherein the program code is program code of a conventional imperative language.

7. The computer program product of claim 1, wherein the loader module is configured to allocate a code area and at least one of a read only data area, a read write data area, and a stack area before loading the program code into the memory.

8. The computer program product of claim 1, wherein the loader module is configured to receive the program code via a communication network.

9. The computer program product of claim 1, wherein the loader module is configured to load the program code in sections.

10. The computer program product of claim 1, wherein relinking the program code comprises modifying the most significant bits of the program code's addresses, in order to adapt the program code to the respective non-defective memory banks to which the program code has been loaded.

11. The computer program product of claim 1, wherein the loader module is configured to load program code into a memory of an xDSL card.

12. The computer program product of claim 1, wherein the loader module is further configured to cause the processor to execute instructions directing the processor to:
   create a first relinked version of the program code corresponding to a first memory bank of the memory;
   create a second relinked version of the program code corresponding to a second memory bank of the memory; and
   select the first relinked version or the second relinked version of program code for loading into the memory based on the diagnostic information,
   wherein the loading of the program code loads the selected version of the program code into the memory.

13. A memory, with non-defective parts of the memory being identified by diagnostic information, said memory comprising:
   a loader program contained in a non-defective portion of the memory, said loader program being configured to load program code, in accordance with the diagnostic information, into other non-defective parts of the memory, and to relink the program code in accordance with locations of the non-defective parts of the memory to which the program code has been loaded, wherein:
   relinking the program code comprises modifying at least one of an absolute address and a relative address of at least one instruction from the program code in order to adapt an executable portion of the program code to the respective non-defective memory locations to which the program code has been loaded;
   said address modifications are carried out after the program code has been loaded in the non-defective parts of the memory, and
   said relinking does not change a size of the memory space occupied in the memory by the program code's instructions, absolute addresses and relative addresses.

14. The memory of claim 13, wherein the memory comprises a set of memory banks, with non-defective memory banks being identified by the diagnostic information.

15. A method for loading program code into a partially defective memory, with non-defective parts of the memory being identified by diagnostic information, the method comprising:
   loading program code, in accordance with the diagnostic information, into the non-defective parts of the memory, and
   relinking the program code in accordance with locations of the non-defective parts of the memory to which the program code has been loaded;
   wherein:
   relinking the program code comprises at least one of modifying an absolute address and a relative address of at least one instruction from the program code in order to adapt an executable portion of the program code to the respective memory locations to which the program code has been loaded;
   said address modifications are carried out after the program code has been loaded in the non-defective parts of the memory, and
   said relinking does not change a size of the memory space occupied in the memory by the program code's instructions, absolute addresses and relative addresses.

16. The method of claim 15, further comprising testing the memory in order to obtain the diagnostic information.

17. The method of claim 15, wherein the diagnostic information is provided by an external diagnostic facility.

18. The method of claim 15, wherein the loading and relinking are performed by a loader module that is stored in a non-defective part of the memory.

19. The method of claim 15, wherein the loading and relinking are performed by an external loading facility.

20. The method of claim 15, further comprising allocating a code area and at least one of a read only data area, a read write data area, and a stack area before loading the program code into the memory.

21. The method of claim 15, wherein the relinking the program code comprises modifying the most significant bits of at least one address within the program code in order to adapt the program code to the respective non-defective memory banks to which the program code has been loaded.

22. A non-transitory computer readable storage medium having computer program code recorded thereon, that when executed by a processor, causes the processor to load program code into a partially defective memory, with non-defective parts of the memory being identified by diagnostic information, said execution comprising:
   loading the program code, in accordance with the diagnostic information, into the non-defective parts of the memory;
   relinking the program code in accordance with locations of the non-defective parts of the memory to which the program code has been loaded, wherein
   the relinking the program code comprises modifying at least one of the program code's instructions, absolute addresses and relative addresses, in order to adapt an executable portion of the program code to the respective non-defective parts of the memory to which the program code has been loaded;
   the modifying is performed after the program code has been loaded in the non-defective parts of the memory, and
   said relinking does not change a size of the memory space occupied in the non-defective memory by the program code's instructions, absolute addresses and relative addresses.

23. A computer program product comprising a non-transitory computer-readable medium having a loader module embodied in the medium for causing a processor to execute instructions directing the processor to:
   create a first relinked version of a program code that is relinked based on an assumption that a first memory bank of memory is defective;
   create a second relinked version of the program code that is relinked based on an assumption that a second memory bank of the memory is defective, the second bank of memory being different from the first bank of memory, and the second relinked version of the program code being different from the first relinked version of the program code;
   diagnose whether the first memory bank of memory or the second memory bank of memory is defective;
   select the first relinked version of the program code when the diagnosis determines the first memory bank of memory to be defective or the second relinked version of the program code when the diagnosis determines the second memory bank of memory to be defective;

load the selected version of the program code into the memory; and relink the selected version in accordance with non-defective memory locations into which the selected version has been loaded.

* * * * *